United States Patent
Cochran et al.

(10) Patent No.: US 8,815,408 B1
(45) Date of Patent: Aug. 26, 2014

(54) METAL SYNTACTIC FOAM

(75) Inventors: Joe K. Cochran, Marietta, GA (US);
Thomas H. Sanders, Atlanta, GA (US);
Oliver M. Strbik, III, Holland, OH
(US); Carol Ann Wedding, Toledo, OH
(US)

(73) Assignee: Imaging Systems Technology, Inc.,
Toledo, OH (US)

( * ) Notice: Subject to any disclaimer, the term of this patent is extended or adjusted under 35 U.S.C. 154(b) by 693 days.

(21) Appl. No.: 12/962,714

(22) Filed: Dec. 8, 2010

Related U.S. Application Data

(60) Provisional application No. 61/267,488, filed on Dec. 8, 2009.

(51) Int. Cl.
*B32B 5/18* (2006.01)
*B32B 5/22* (2006.01)
*B32B 15/04* (2006.01)
*B32B 15/14* (2006.01)

(52) U.S. Cl.
USPC ............ 428/613; 428/304.4; 428/312.8; 428/660

(58) Field of Classification Search
CPC ............ B32B 5/18; B32B 5/22; B32B 5/00; B32B 15/00; B32B 15/04; B32B 15/14; B32B 15/20; B32B 3/12; B32B 3/26; B32B 2305/028
USPC ......... 428/613, 614, 658, 674, 675, 676, 677, 428/678, 679, 680, 659, 660, 304.4, 312.8, 428/313.3, 313.9, 314.2, 315.5, 316.6, 428/317.9, 318.4, 319.1
See application file for complete search history.

(56) References Cited

U.S. PATENT DOCUMENTS

| | | | |
|---|---|---|---|
| 2,187,432 A | 1/1940 | Powers | |
| 3,264,073 A | 8/1966 | Schmitt | |
| 3,365,315 A | 1/1968 | Beck et al. | |
| 3,528,809 A | 9/1970 | Farnand et al. | |
| 3,607,169 A | 9/1971 | Coxe | |
| 3,674,461 A | 7/1972 | Farnand et al. | |
| 3,699,050 A | 10/1972 | Henderson | |
| 3,781,170 A * | 12/1973 | Nakao et al. | 75/232 |
| 3,793,041 A | 2/1974 | Sowman | |
| 3,838,998 A | 10/1974 | Matthews et al. | |
| 3,916,584 A | 11/1975 | Howard et al. | |
| 3,975,194 A | 8/1976 | Farnand et al. | |
| 4,017,290 A | 4/1977 | Budrick et al. | |
| 4,075,025 A | 2/1978 | Rostoker | |
| 4,119,422 A | 10/1978 | Rostoker | |
| 4,133,854 A | 1/1979 | Hendricks | |
| 4,162,914 A | 7/1979 | Cremer | |
| 4,163,637 A | 8/1979 | Hendricks | |
| 4,166,147 A | 8/1979 | Lange et al. | |
| 4,257,798 A | 3/1981 | Hendricks et al. | |
| 4,279,632 A | 7/1981 | Frosch et al. | |
| 4,290,847 A | 9/1981 | Johnson et al. | |
| 4,303,061 A | 12/1981 | Torobin | |
| 4,303,431 A | 12/1981 | Torobin | |
| 4,303,432 A | 12/1981 | Torobin | |

(Continued)

*Primary Examiner* — Michael E La Villa
(74) *Attorney, Agent, or Firm* — Donald K. Wedding

(57) ABSTRACT

A syntactic foam comprising hollow metallic shells and a solid metal foam matrix. The metal foam composites show high strength, particularly in comparison to previous metal foams, while maintaining a favorable strength to density ratio. The composite metal foams can be prepared by various techniques, such as powder metallurgy and casting or aspiration casting.

2 Claims, 15 Drawing Sheets

(56) References Cited

U.S. PATENT DOCUMENTS

| | | | |
|---|---|---|---|
| 4,303,433 | A | 12/1981 | Torobin |
| 4,303,603 | A | 12/1981 | Torobin |
| 4,303,729 | A | 12/1981 | Torobin |
| 4,303,730 | A | 12/1981 | Torobin |
| 4,303,731 | A | 12/1981 | Torobin |
| 4,303,732 | A | 12/1981 | Torobin |
| 4,303,736 | A | 12/1981 | Torobin |
| 4,307,051 | A | 12/1981 | Sargeant et al. |
| 4,314,827 | A | 2/1982 | Leitheiser et al. |
| 4,322,378 | A | 3/1982 | Hendricks |
| 4,344,787 | A | 8/1982 | Beggs et al. |
| 4,349,456 | A | 9/1982 | Sowman |
| 4,363,646 | A | 12/1982 | Torobin |
| 4,391,646 | A | 7/1983 | Howell |
| 4,392,988 | A | 7/1983 | Dobson et al. |
| 4,415,512 | A | 11/1983 | Torobin |
| 4,459,145 | A | 7/1984 | Elsholz |
| 4,493,875 | A | 1/1985 | Beck et al. |
| 4,525,314 | A | 6/1985 | Torobin |
| 4,542,066 | A | 9/1985 | Delzant |
| 4,547,233 | A | 10/1985 | Delzant |
| 4,548,196 | A | 10/1985 | Torobin |
| 4,548,767 | A | 10/1985 | Hendricks |
| 4,568,389 | A | 2/1986 | Torobin |
| 4,582,534 | A | 4/1986 | Torobin |
| 4,595,623 | A | 6/1986 | Du Pont et al. |
| 4,596,681 | A | 6/1986 | Grossman et al. |
| 4,618,525 | A | 10/1986 | Chamberlain et al. |
| 4,637,990 | A | 1/1987 | Torobin |
| 4,671,909 | A | 6/1987 | Torobin |
| 4,713,300 | A | 12/1987 | Sowman et al. |
| 4,743,511 | A | 5/1988 | Sowman et al. |
| 4,743,545 | A | 5/1988 | Torobin |
| 4,757,036 | A | 7/1988 | Kaar et al. |
| 4,775,598 | A | 10/1988 | Jaeckel |
| 4,777,154 | A | 10/1988 | Torobin |
| 4,778,502 | A | 10/1988 | Garnier et al. |
| 4,793,980 | A | 12/1988 | Torobin |
| 4,797,378 | A | 1/1989 | Sowman |
| 4,800,180 | A | 1/1989 | McAllister et al. |
| 4,865,875 | A | 9/1989 | Kellerman |
| 4,883,779 | A | 11/1989 | McAllister et al. |
| 4,916,173 | A | 4/1990 | Otloski et al. |
| 4,917,857 | A | 4/1990 | Jaeckel et al. |
| 5,017,316 | A | 5/1991 | Sowman |
| 5,030,603 | A | 7/1991 | Rumpf et al. |
| 5,053,436 | A | 10/1991 | Delgado |
| 5,069,702 | A | 12/1991 | Block et al. |
| 5,077,241 | A | 12/1991 | Moh et al. |
| 5,120,455 | A | 6/1992 | Lunghofer |
| 5,185,299 | A | 2/1993 | Wood et al. |
| 5,212,143 | A | 5/1993 | Torobin |
| 5,225,123 | A | 7/1993 | Torobin |
| 5,397,759 | A | 3/1995 | Torobin |
| 5,587,231 | A | 12/1996 | Meteer et al. |
| 5,770,136 | A * | 6/1998 | Huang ............... 264/101 |
| 5,846,357 | A | 12/1998 | Meteer et al. |
| 5,888,642 | A | 3/1999 | Meteer et al. |
| 6,364,018 | B1 | 4/2002 | Brannon |
| 6,368,708 | B1 | 4/2002 | Brown et al. |
| 6,582,651 | B1 | 6/2003 | Cochran et al. |
| 6,737,017 | B2 | 5/2004 | Woodfield et al. |
| 6,753,299 | B2 | 6/2004 | Lunghofer et al. |
| 6,921,510 | B2 | 7/2005 | Ott et al. |
| 7,001,570 | B2 | 2/2006 | Niimi |
| 7,135,141 | B2 | 11/2006 | Han et al. |
| 7,160,844 | B2 | 1/2007 | Urbanek |
| 7,213,651 | B2 | 5/2007 | Brannon et al. |
| 7,718,751 | B2 | 5/2010 | Orpin |
| 7,776,255 | B1 | 8/2010 | Wedding et al. |
| 2005/0124708 | A1 | 6/2005 | Kim |
| 2006/0140813 | A1* | 6/2006 | Rabiei ............... 419/2 |
| 2007/0032575 | A1 | 2/2007 | Bulluck et al. |

* cited by examiner

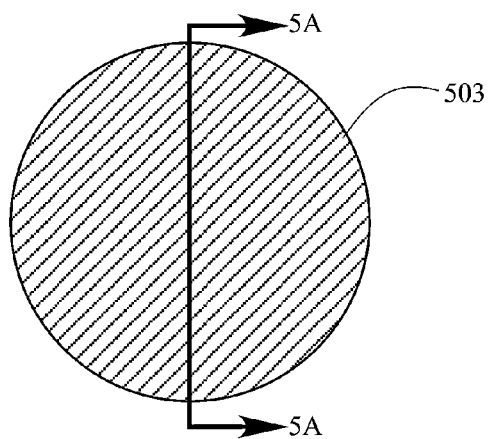
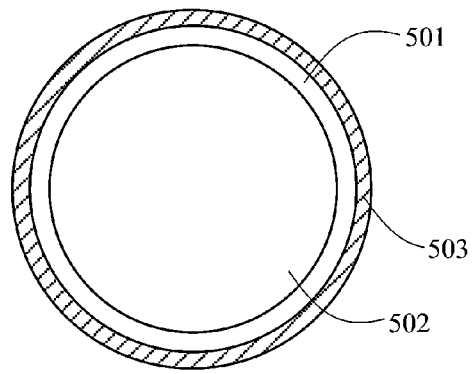
FIG. 5                               FIG. 5A
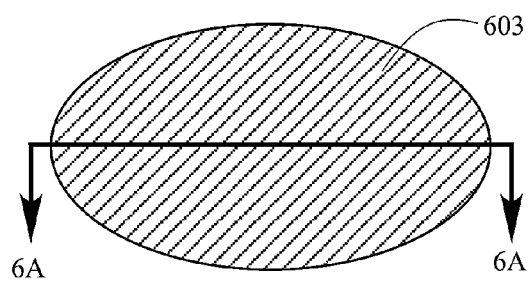
FIG. 6
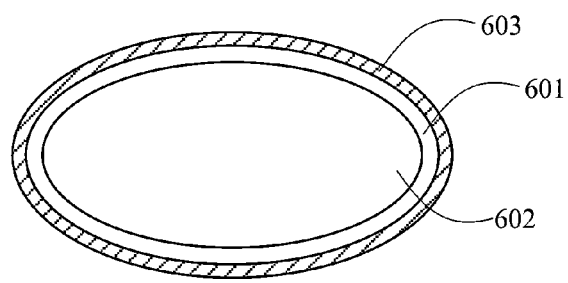
FIG. 6A

METAL SYNTACTIC FOAM

RELATED APPLICATION

This application claims priority under 35 U.S.C. 119(e) for U.S. Provisional Application Ser. No. 61/267,488 filed Dec. 8, 2009.

FIELD OF THE INVENTION

The present invention is directed to syntactic metal foams and methods of preparation thereof. The syntactic foams generally comprise hollow metallic shells and a solid metal matrix. What is disclosed is an improved syntactic foam of a metal matrix and hollow metal shells. The material is characterized by improved material compatibility, improved ordering of the hollow shells in the matrix, improved geometric shaping of the hollow shells, beneficial additives to the matrix, and improved post processing steps.

BACKGROUND

A foam is a substance that is formed by trapping many gas bubbles in a liquid or solid. The term foam may also refer to anything that is analogous to such a phenomenon, such as quantum foam, polyurethane foam (foam rubber), XPS foam, polystyrene, or many other manufactured foams. A foam may be open cell or closed cell. Fine foam can be considered a type of colloid. Syntactic foam is foam produced of composite materials synthesized by filling a matrix with hollow particles or shells. The matrix material can be selected from almost any metal, polymer, or ceramic.

A wide variety of hollow shells are available, including cenospheres, glass microspheres, and carbon and polymer microballoons, hollow ceramic and metal shells. The presence of hollow shells results in lower density, higher strength, a lower coefficient of thermal expansion, and, in some cases, radar or sonar transparency. Syntactic foams containing microspheres are disclosed in U.S. Pat. No. 7,718,751 (Orpin), U.S. Pat. No. 5,888,642 (Meteer et al.), U.S. Pat. No. 5,846,357 (Meteer et al.), U.S. Pat. No. 5,587,231 (Meteer et al.), U.S. Pat. No. 4,916,173 (Otloski et al.), U.S. Pat. No. 4,595,623 (DuPont et al.), and U.S. Patent Application Publication Nos. 2007/0032575 (Bulluck et al.) and 2005/0124708 (Kim), all incorporated herein by reference.

The compressive properties of syntactic foams primarily depend on the properties of the hollow shells, whereas the tensile properties depend on the matrix material that holds the shells together.

Customization is one of the biggest advantages of syntactic foams. There are two main ways of adjusting the properties of these materials. The first method is to change the volume fraction of hollow shells in the syntactic foam structure. The second method is to use hollow shells of different wall thickness. In general, the compressive strength of the material is proportional to its density.

Syntactic materials were developed in early 1960s as buoyancy aid materials for marine applications. Other characteristics led these materials to aerospace and ground transportation vehicle applications. Current applications for syntactic foam include buoyancy modules for marine riser tensioners, boat hulls, deep-sea exploration, autonomous underwater vehicles (AUV), parts of helicopters and airplanes, and sporting goods such as soccer balls.

Metallic or metal foams are a class of materials with very low densities and novel mechanical, thermal, electrical, and acoustic properties. In comparison to conventional solids and polymer foams, metal foams are light weight, recyclable, and non-toxic. Particularly, metal foams offer high specific stiffness, high strength, enhanced energy absorption, sound and vibration dampening, and tolerance to high temperatures. Furthermore, by altering the size and shape of the cells in metal foams, mechanical properties of the foam can be engineered to meet the demands of a wide range of applications.

Various methods are presently known in the art for preparing metallic foams. According to one method, metal powders are compacted together with suitable blowing agents, and the compressed bodies are heated above the solidus temperature of the metal matrix and the decomposition temperature of the blowing agent to generate gas evolution within the metal. Such "self-expanding foams" can also be prepared by stirring the blowing agents directly into metal melts. Metallic foams can also be prepared as "blown foams" by dissolving or injecting blowing gases into metal melts. Metallic foams can also be prepared by methods wherein gasses or gas-forming chemicals are not used. For example, metal melts can be caused to infiltrate porous bodies, which are later removed after solidification of the melt, leaving pores within the solidified material.

Metallic foams of this type have been shown to experience fatigue degradation in response to both tension and compression. Plastic deformation under cyclic loading occurs preferentially within deformation bands, until the densification strain has been reached. The bands generally form at large cells in the ensemble, mainly because known processes for producing these materials do not facilitate formation in a uniform manner. Such large cells develop plastically buckled membranes that experience large strains upon further cycling and will lead to cracking and rapid cyclic straining. As a result, the performance of existing foams has not been promising due to strong variations in their cell structure as disclosed in Y. Sugimura, J. Meyer, M. Y. He, H. Bart-Smith, J. Grenstedt, & A. G. Evans, "On the Mechanical Performance of Closed Cell Al Alloy Foams", *Acta Materialia,* 45(12), pp. 5245-5259, incorporated herein by reference.

In the production of closed cell metallic foams, one obstacle is the inability to finely control cell size, shape, and distribution. This makes it difficult to create a consistently reproducible material where the properties are known with predictable failure. One method for creating a uniform closed cell metallic foam is to use prefabricated spheres of a known size distribution and join them together into a solid form, such as through sintering of the spheres, thereby forming a closed cell Hollow Sphere Foam (HSF).

In addition to metal foams formed with a blow gas, there are also syntactic metal foams known in the prior art. In this case, a metal matrix surrounds a hollow shell composed of glass, ceramic, glass ceramic, metal, or other materials. U.S. Pat. No. 4,568,389 (Torobin) describes a structure and method of producing closed cell metallic foam using hollow metal shells mixed into a metal matrix.

Incorporated herein by reference is a published 1998 report Number 19991001071 to the Office of Naval Research entitled "Fabrication and Microstructure of Metal-Metal Syntactic Foams", in which the team of Dr. J. H. Nadler et al. of Georgia Institute of Technology describes a metal-metal syntactic foam matrix composite microstructure consists of thinwall, hollow Fe—Cr stainless steel spheres cast in various metal matrices including aluminum alloys 6061, 7075, 413, magnesium alloy AZ31B, and unalloyed aluminum and magnesium. Stainless steel spheres fabricated by the Georgia Tech team were sufficiently uniform to allow arrangement into random or periodic arrays. These arrays were infiltrated by an aspiration casting process, resulting in a structure less dense than the matrix metal. During their research the team reported intermetallic formation on the boundaries of the hollow shells due to interaction of iron of the sphere and the alumina of the matrix.

Accordingly, it is desirable to have metallic foams wherein cell size, shape, and distribution are controllable, and wherein high strength is exhibited. Such goals are achieved by the composite metal foams of the present invention and the methods of preparation thereof.

RELATED PRIOR ART METHODS OF PRODUCING MICROSPHERES

A variety of methods and processes have been used to produce hollow shells including microspheres. Microspheres have been formed from glass, ceramic, glass ceramic, metal, plastic, and other inorganic and organic materials. Some methods for producing hollow shells including microspheres are disclosed hereafter.

Some methods used to produce hollow glass microspheres incorporate a blowing gas into the lattice of a glass while in frit form. The frit is heated and glass bubbles are formed by the in-permeation of the blowing gas. Microspheres formed by this method have diameters ranging from about 5 µm to approximately 5,000 µm. The blowing gases typically include $SO_2$, $CO_2$, and/or $H_2O$.

Methods of manufacturing glass frit for forming hollow microspheres are disclosed by U.S. Pat. No. 4,017,290 (Budrick et al.) and U.S. Pat. No. 4,021,253 (Budrick et al.). Budrick et al. (290) discloses a process whereby occluded material gasifies to form the hollow microsphere. Hollow microspheres are disclosed in U.S. Pat. No. 5,500,287 (Henderson) and U.S. Pat. No. 5,501,871 (Henderson). According to Henderson (287), the hollow microspheres are formed by dissolving a permeant gas (or gases) into glass frit particles. The gas permeated frit particles are then heated at a high temperature sufficient to blow the frit particles into hollow microspheres containing the permeant gases.

U.S. Pat. No. 4,257,798 (Hendricks et al.) discloses a method for manufacturing small hollow glass spheres filled with a gas introduced during the formation of the spheres, and is incorporated herein by reference. The gases disclosed include argon, krypton, xenon, bromine, DT, hydrogen, deuterium, helium, hydrogen, neon, and carbon dioxide. Other Hendricks patents for the manufacture of glass spheres include U.S. Pat. Nos. 4,133,854 and 4,186,637, both incorporated herein by reference.

Microspheres are also produced as disclosed in U.S. Pat. No. 4,415,512 (Torobin), incorporated herein by reference. This method by Torobin comprises forming a film of molten glass across a blowing nozzle and applying a blowing gas at a positive pressure on the inner surface of the film to blow the film and form an elongated cylinder shaped liquid film of molten glass. An inert entraining fluid is directed over and around the blowing nozzle at an angle to the axis of the blowing nozzle so that the entraining fluid dynamically induces a pulsating or fluctuating pressure at the opposite side of the blowing nozzle in the wake of the blowing nozzle. The continued movement of the entraining fluid produces asymmetric fluid drag forces on a molten glass cylinder, which close and detach the elongated cylinder from the coaxial blowing nozzle. Surface tension forces acting on the detached cylinder form the latter into a spherical shape, which is rapidly cooled and solidified by cooling means to form a glass microsphere. In one embodiment of the above method for producing the microspheres, the ambient pressure external to the blowing nozzle is maintained at a super atmospheric pressure. The ambient pressure external to the blowing nozzle is such that it substantially balances, but is slightly less than the blowing gas pressure. Such a method is disclosed by U.S. Pat. No. 4,303,432 (Torobin) and WO 8000438A1 (Torobin), both incorporated herein by reference. The microspheres may also be produced using a centrifuge apparatus and method as disclosed by U.S. Pat. No. 4,303,433 (Torobin) and WO8000695A1 (Torobin), both incorporated herein by reference. Other methods for forming microspheres of glass, ceramic, glass ceramic, metal, plastic, and other materials are disclosed in other Torobin patents including U.S. Pat. Nos. 5,397,759; 5,225,123; 5,212,143; 4,793,980; 4,777,154; 4,743,545; 4,671,909; 4,637,990; 4,582,534; 4,568,389; 4,548,196; 4,525,314; 4,363,646; 4,303,736; 4,303,732; 4,303,731; 4,303,603; 4,303,431; 4,303,730; 4,303,729; and 4,303,061, all incorporated herein by reference. U.S. Pat. No. 3,607,169 (Coxe) and U.S. Pat. No. 4,303,732 (Torobin) disclose an extrusion method in which a gas is blown into molten glass and individual shells are formed. As the shells leave the chamber, they cool and some of the gas is trapped inside.

Also incorporated herein by reference is U.S. Pat. No. 7,730,746 issued to Thomas J. Pavliscak and Carol Ann Wedding which discloses the manufacture of discrete hollow microspheres.

U.S. Pat. No. 4,349,456 (Sowman), incorporated herein by reference, discloses a process for making ceramic metal oxide microspheres by blowing a slurry of ceramic and highly volatile organic fluid through a coaxial nozzle. As the liquid dehydrates, gelled microcapsules are formed. These microcapsules are recovered by filtration, dried, and fired to convert them into microspheres. Prior to firing, the microcapsules are sufficiently porous that, if placed in a vacuum during the firing process, the gases can be removed and the resulting microspheres will generally be impermeable to ambient gases. The shells formed with this method may be filled with a variety of gases and pressurized from near vacuums to above atmosphere. This is a suitable method for producing microspheres. However, shell uniformity may be difficult to control.

U.S. Patent Application Publication 2002/0004111 (Matsubara et al.), incorporated herein by reference discloses a method of preparing hollow glass microspheres by adding a combustible liquid (kerosene) to a material containing a foaming agent. Methods for forming microspheres are also disclosed in U.S. Pat. No. 3,848,248 (MacIntyre), U.S. Pat. No. 3,998,618 (Kreick et al.), and U.S. Pat. No. 4,035,690 (Roeber), discussed above and incorporated herein by reference. Methods of manufacturing hollow microspheres are disclosed in U.S. Pat. No. 3,794,503 (Netting), U.S. Pat. No. 3,796,777 (Netting), U.S. Pat. No. 3,888,957 (Netting), and U.S. Pat. No. 4,340,642 (Netting et al.), all incorporated herein by reference. Other prior art methods for forming microspheres are disclosed in the prior art including U.S. Pat. No. 3,528,809 (Farnand et al.), U.S. Pat. No. 3,957,194 (Farnand et al.), U.S. Pat. No. 4,025,689 (Kobayashi et al.), U.S. Pat. No. 4,211,738 (Genis), U.S. Pat. No. 4,307,051 (Sargeant et al.), U.S. Pat. No. 4,569,821 (Duperray et al.), U.S. Pat. No. 4,775,598 (Jaeckel), and U.S. Pat. No. 4,917,857 (Jaeckel et al.), all of which are incorporated herein by reference. These references disclose a number of methods which comprise an organic core such as naphthalene or a polymeric core such as foamed polystyrene which is coated with an inorganic material such as aluminum oxide, magnesium, refractory, carbon powder, or the like. The core is removed such as by pyrolysis, sublimation, or decomposition and the inorganic coating sintered at an elevated temperature to form a sphere or microsphere. Farnand et al. (809) discloses the production of hollow metal spheres by coating a core material such as naphthalene or anthracene with metal flakes such as aluminum or magnesium. The organic core is sublimed at room temperature over 24 to 48 hours. The aluminum or magnesium is then heated to an elevated temperature in oxygen to form aluminum or magnesium oxide. The core may also be coated with a metal oxide such as aluminum oxide and reduced to metal. The resulting hollow spheres are used for thermal insulation, plastic filler, and bulking of liquids such as hydrocarbons.

Farnand (194) discloses a similar process comprising polymers dissolved in naphthalene including polyethylene and polystyrene. The core is sublimed or evaporated to form hollow spheres or microballoons. Kobayashi et al. (689) discloses the coating of a core of polystyrene with carbon powder. The core is heated and decomposed and the carbon powder heated in argon at 3000° C. to obtain hollow porous graphitized spheres. Genis (738) discloses the making of lightweight aggregate using a nucleus of expanded polystyrene pellet with outer layers of sand and cement. Sargeant et al. (051) discloses the making of light weight-refractories by wet spraying core particles of polystyrene with an aqueous refractory coating such as clay with alumina, magnesia, and/or other oxides. The core particles are subject to a tumbling action during the wet spraying and fired at 1730° C. to form porous refractory. Duperray et al. (821) discloses the making of a porous metal body by suspending metal powder in an organic foam which is heated to pyrolyze the organic and sinter the metal. Jaeckel (598) and Jaeckel et al. (857) disclose the coating of a polymer core particle such as foamed polystyrene with metals or inorganic materials followed by pyrolysis on the polymer and sintering of the inorganic materials to form the sphere. Both disclose the formation of metal spheres such as copper or nickel spheres which may be coated with an oxide such as aluminum oxide. Jaeckel et al. (857) further discloses a fluid bed process to coat the core.

The hollow shell may be of any suitable geometric shape for example as disclosed in U.S. Pat. No. 6,864,631 (Wedding), U.S. Pat. No. 7,247,989 (Wedding), U.S. Pat. No. 7,456,571 (Wedding), U.S. Pat. No. 7,604,523 (Wedding et al.), U.S. Pat. No. 7,622,866 (Wedding et al.), U.S. Pat. No. 7,628,666 (Strbik, III et al.), U.S. Pat. No. 7,638,943 (Wedding et al.), and U.S. Pat. No. 7,727,040 (Strbik, III et al.), all incorporated herein by reference.

SUMMARY OF THE INVENTION

This invention relates to an improved composite metallic foam comprising hollow metal spheres and a metallic foam matrix. The material is characterized by improved material compatibility, improved ordering of the hollow shells in the matrix, improved geometric shaping of the hollow shells, beneficial additives to the matrix, and improved post processing steps.

The foam exhibits low density and high strength. Generally, the composite metallic foam is prepared by filling in the spaces around the hollow metallic spheres, thus creating a solid matrix. Such preparation can be by various methods, including powder metallurgy techniques and casting techniques. The composite metallic foams of the invention have unique properties that provide use in multiple applications, such as marine structures, space vehicles, automobiles, and buildings. The foams are particularly useful in applications where weight is critical and vibration damping, as well as energy absorption, are useful, such as blast panels for military applications and crumple zones for automotive crash protection. The application of the foams can also be extended into biomedical engineering as medical implants and even to civil engineering for earthquake protection in heavy structures.

The composite metal foams of the invention, partly due to their controlled porosity, through use of preformed hollow metallic shells and foam cell wall support, and through addition of a metal matrix surrounding the hollow metallic shells, exhibit highly improved mechanical properties, particularly under compression loading.

In one embodiment, there is provided a composite metal foam comprising a plurality of hollow shells (preferably hollow metallic shells) and a metal foam matrix generally surrounding the hollow shells. The hollow shells and the foam matrix can be comprised of the same or different materials. In one embodiment, the hollow shells are metallic spheres comprising various metals or metal alloys including steel or titanium. The metal foam matrix comprises aluminum, aluminum alloys, magnesium, or magnesium alloys. The hollow shells can be coated with beneficial materials to improve compatibility with the matrix material and reduce the formation of intermetallics. Such beneficial materials include nickel, copper, titanium, and alloys thereof.

According to another embodiment, there is provided a method of preparing a composite metallic foam by placing a plurality of hollow metallic shells in a mold and filling the spaces around the hollow metallic shells with a metal matrix-forming material.

In one embodiment, hollow metallic shells can be positioned for optimum packing. In this case it may be desirable to hold the shells in position with a metal mesh. In addition to holding the shells in place the mesh can provide a net shape form and also add tensile strength to the foam.

The hollow shells can be of geometric shapes other then spherical. However, hollow shells of shapes other than essentially spheres have not been generally available. Additionally, shells other then spherical are difficult to pack. Hollow shell geometric shapes are disclosed in this invention.

BRIEF DESCRIPTION OF THE DRAWINGS

FIG. 5 is a side view of a hollow metal sphere with an optional beneficial coating.

FIG. 5A is a section 5A-5A view of a hollow metal sphere with an optional beneficial coating.

FIG. 6 is a side view of a hollow metal oval sphere with an optional beneficial coating.

FIG. 6A is a section 6A-6A view of a hollow metal oval sphere with an optional beneficial coating.

DETAILED DESCRIPTION OF THE INVENTION

Figure 1:
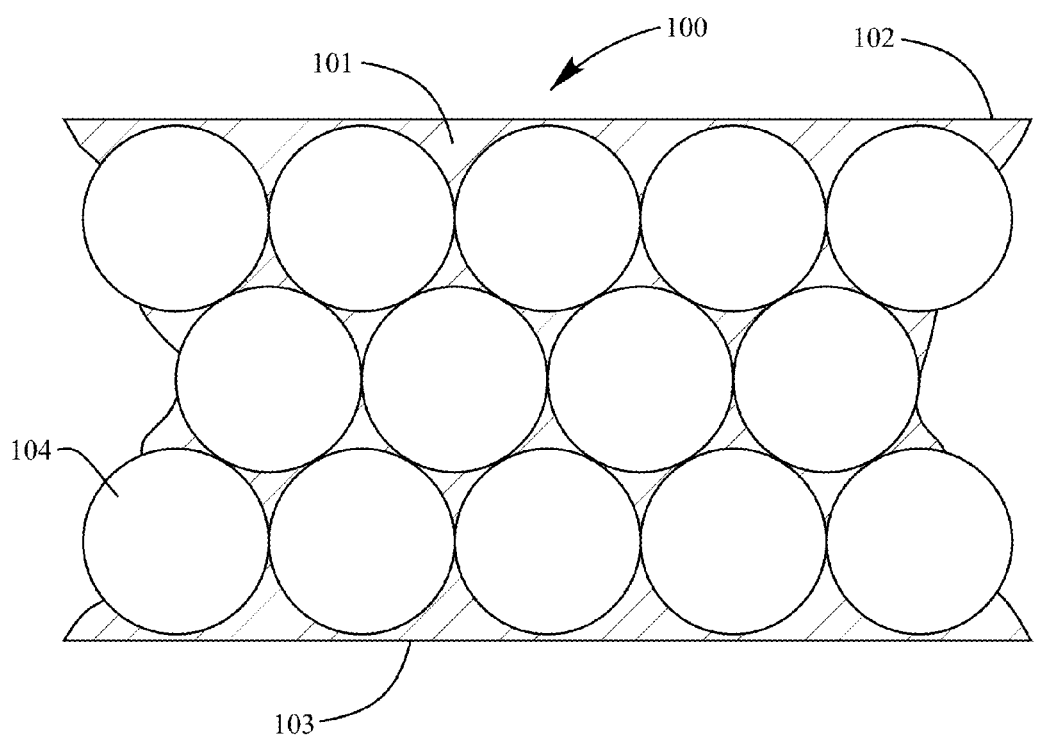
FIG. 1 is a top view of metal spheres in a metallic foam matrix.

FIG. 1 shows metal shells in a metal foam matrix. FIG. 1 illustrates the use of the metal microspheres to form a light weight metal structure 100 having a continuous phase of metal or metal alloy 101 and a discontinuous phase of hollow metal microspheres 104. The light weight metal structure can be made by uniform mixing or dispersing the metal microspheres (until the desired packing is obtained) in a metal or metal alloy powder and compressing the mixture of metal powder and microspheres to compact the mixture. The mixture is then heated under pressure to melt the metal powder and is cooled.

Hollow Shell Shapes

Figure 2:
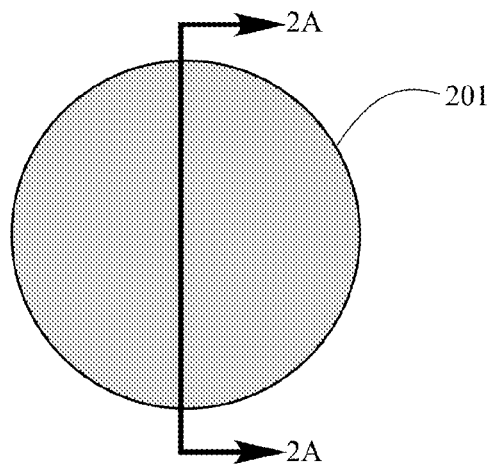
FIG. 2 is a side view of a hollow metal sphere.

FIG. 2 is a side view of a hollow metal sphere 201.

Figure 2A:
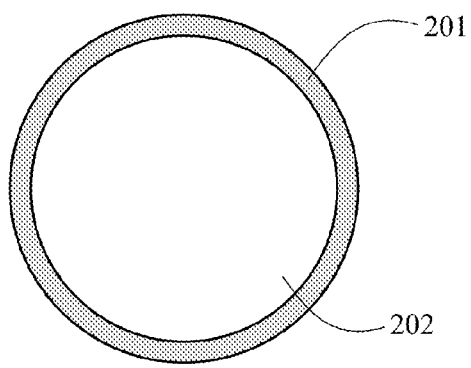
FIG. 2A is a section 2A-2A view of a hollow metal sphere.

FIG. 2A is a section 2A-2A view of a hollow metal sphere 201. It is composed of a metal shell 201 surrounding a hollow interior 202. The shell 201 can be fabricated of pure metal or any metal alloy. Typical shell diameters are between 0.5-50 millimeters. Other diameters are possible. The shell 201 thickness can be varied with respect to the total diameter. Typically the shell thickness is about 10% of the diameter but other thickness can be fabricated including shell thickness of between 5% to 50% of the diameter. Increasing the shell thickness relative to the outer diameter will increase the effective density of the shell. It will also increase the strength.

Hollow shells produced in accordance with this invention are fabricated by coating expendable spherical cores with metal or metal oxides particles bound in a slurry. The coated cores are subject to heat. The cores are pyrolized and the shell is sintering impervious. If metal oxides are used, sintering must be done in a reducing atmosphere. Suitable core materials include, but is not limited to, polystyrene. Other core shapes are possible. Cores can be shaped using a variety of techniques including stamping and molding.

Figure 3:
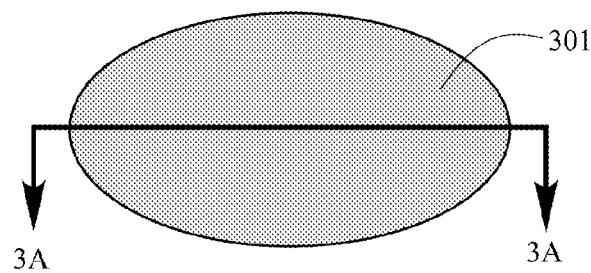
FIG. 3 is a side view of a hollow metal ellipsoid.

FIG. 3 is a side view of a hollow metal ellipsoid 301.

Figure 3A:
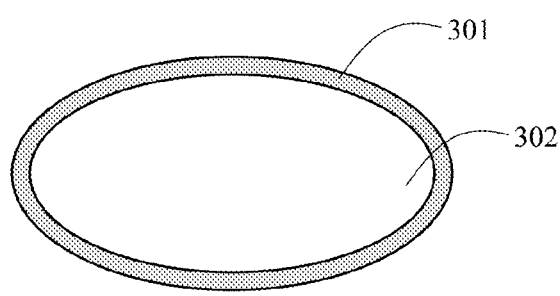
FIG. 3A is a section 3A-3A view of a hollow metal ellipsoid.

FIG. 3A is a section 3A-3A view of a hollow metal ellipsoid 301 surrounding a hollow interior 302. It is formed by coating a core that is an ellipsoid. An ellipsoid is a useful shape as it allows highly dense packing densities of up to 74%.

Figure 4:
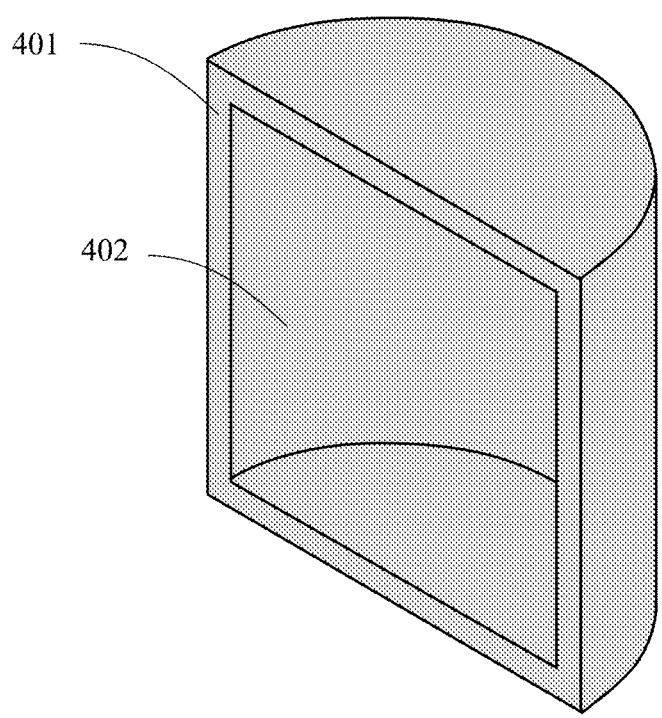
FIG. 4 is a bisected perspective view of a circular cylinder (similar to a small column).
Figure 7:
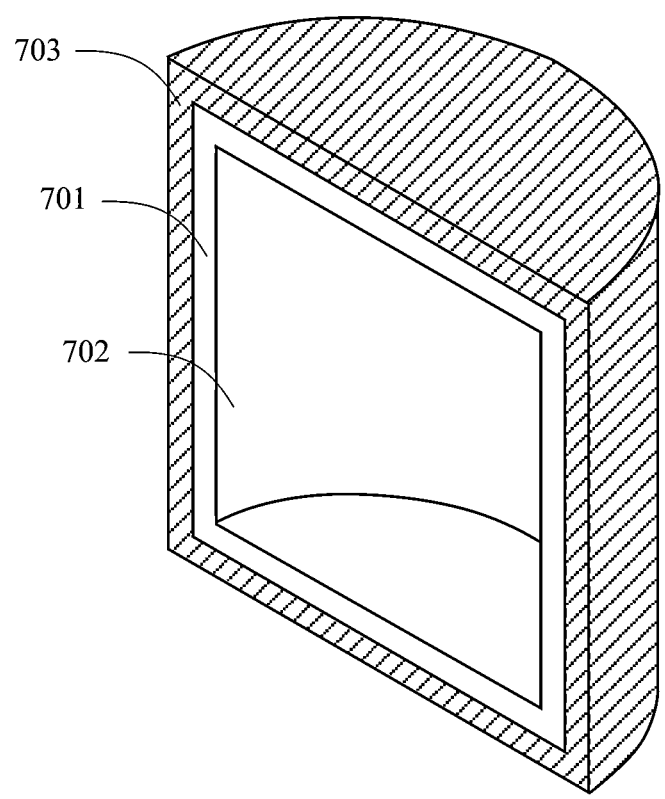
FIG. 7 is a bisected perspective view of a circular cylinder (similar to a small column) with an optional beneficial coating.
Figure 8:
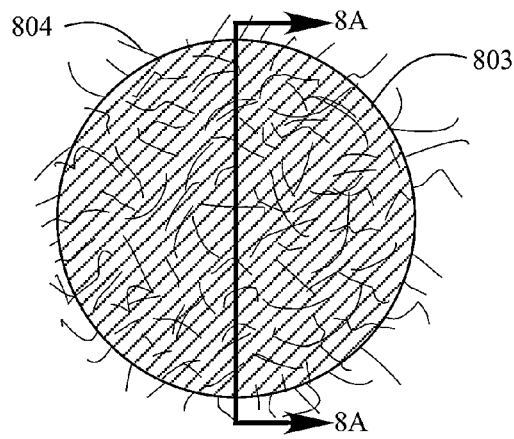
FIG. 8 is a side view of a hollow metal sphere with an optional beneficial coating of whiskers or fibers.
Figure 8A:
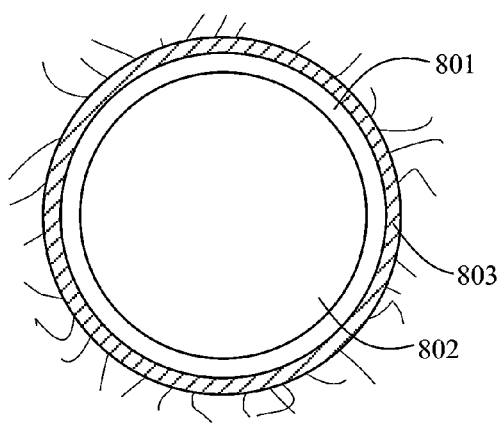
FIG. 8A is a section 8A-8A view of a hollow metal sphere with an optional beneficial coating of whiskers or fibers.
Figure 9:
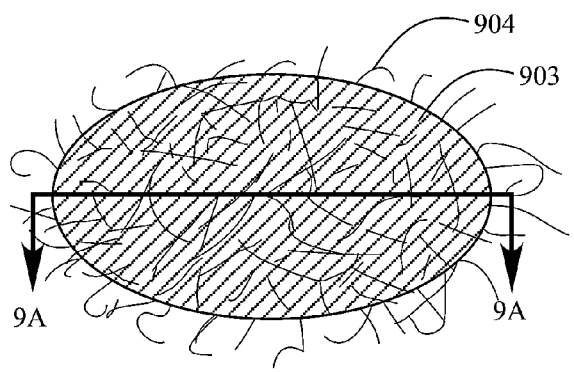
FIG. 9 is a side view of a hollow metal oval sphere with an optional beneficial coating of whiskers or fibers.
Figure 9A:
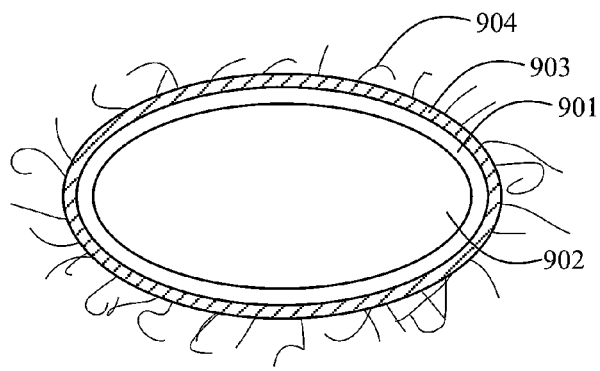
FIG. 9A is a section 9A-9A view of a hollow metal oval sphere with an optional beneficial coating of whiskers or fibers.
Figure 10:
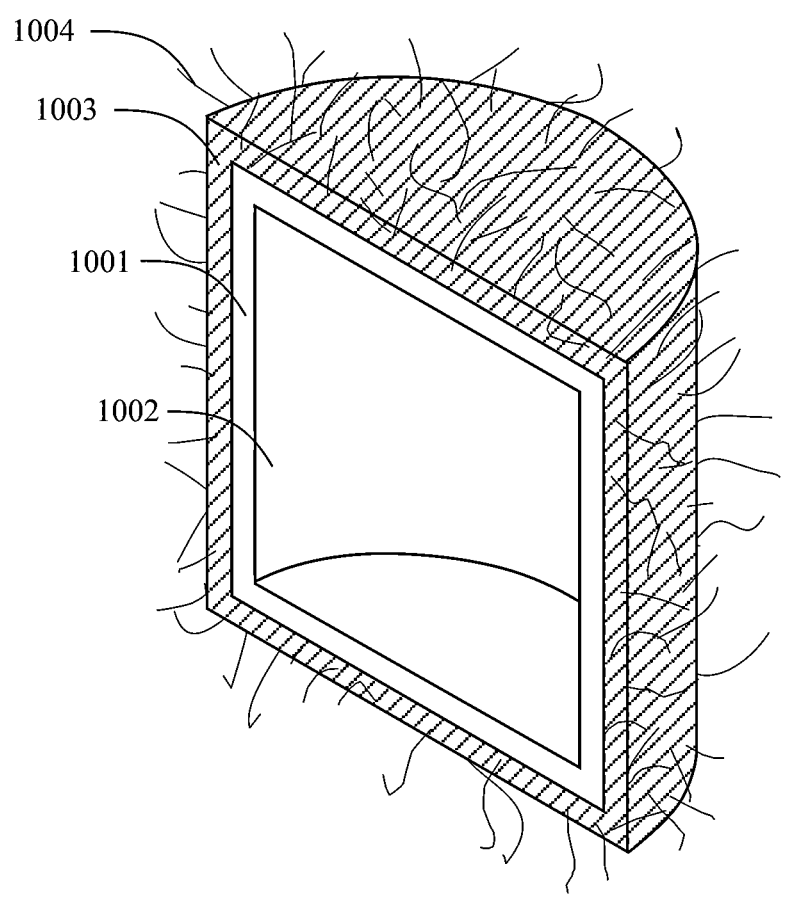
FIG. 10 is a bisected perspective view of a circular cylinder (similar to a small column) with an optional beneficial coating of whiskers or fibers.

FIG. 4 is a bisected perspective view of a circular cylinder 401 (similar to a small column) surrounding a hollow interior 402.

Right circular cylinders 401 can be fabricated to have a ratio of height to diameter of between 1 to 4 and 10 to 1. Other ratios are possible. Other shapes include right hexagonal cylinders are also possible.

Beneficial Coating of Hollow Shells

Regardless of the shape, hollow shells can be coated with additional beneficial coatings. FIGS. 5, 5A, 6, 6A and 7 are examples of shells fabricated with an optional beneficial coating (503, 603, 703). The coating can be applied to the exterior of the shell (501, 601, 701). Beneficial coatings include materials that improve wetting between the matrix and the sphere and form barriers to prevent the formation of intermetallics. Such materials include nickel, copper, zinc, and titanium and or their alloys.

FIGS. 8, 8A, 9, 9A and 10 illustrate other optional beneficial coatings of whiskers or fibers (804, 904, 1004). It can be applied alone or in conjunction with other beneficial coatings (803, 903, 1003). Fibers or whiskers (804, 904, 1004) can be selected from any material that will withstand the processing temperatures of metals. This includes metal, glass, ceramics, and glass ceramics. Fibers or whiskers (804, 904, 1004) add strength and can help interlock the hollow shells (801, 901, 1001) in place.

Improved Ordering of Hollow Shells in Matrix

In order to have uniform mechanical properties, it is desirable to have a uniform distribution of hollow shells in the metal matrix. It is additionally desirable have a matrix that is free of voids or air pockets. One method of achieving a uniform distribution is to use shells that are neutrally buoyant with respect to the matrix metal.

If the shells are not the same density they will tend to sink or float. In this case one or more layers of mesh can be used to trap the hollow shells in evenly spaced arrangements. The mesh can also be used to facilitate complex net shapes and or separate different kinds of hollow shells.

In some embodiments, it may be useful to use screens, or other similar means, for maintaining the arrangement of the spheres within the mold. In addition to gravity casting, the mold may be subject to pressure differentials during the cast process. For example, in one embodiment, the mold may be pressurized. In another embodiment, the mold may be under a vacuum.

Figure 11A:
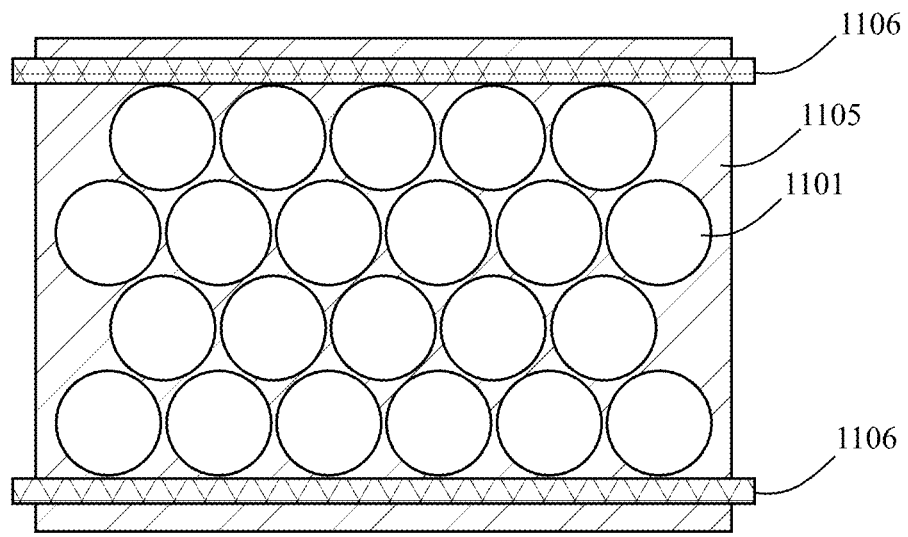
FIG. 11A is a side view of hollow metal spheres in a close packed arrangement surrounded by a metal matrix held in place by a mesh.

FIG. 11A is a side view of hollow metal spheres 1101 in a close packed arrangement surrounded by a metal matrix 1105 held in place by a mesh 1106.

Figure 11B:
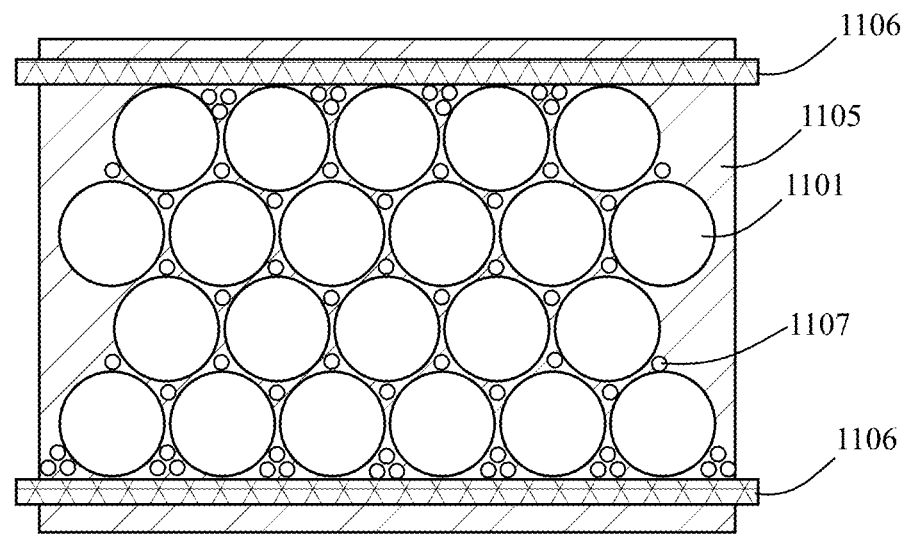
FIG. 11B shows an alternative packing of hollow spheres comprised of a bi-model size distribution.

FIG. 11B shows an alternative packing of hollow spheres comprised of a bi-model size distribution. Small diameter spheres 1107 of less then one seventh of the diameter of the large spheres 1101 can be interspersed between the larger spheres 1101. The result is denser packing. Additionally whiskers as shown in FIG. 4 can be used to facilitate locking of the sphere in place. This can be accomplished in conjunction with a mesh 1106 or in place of a mesh.

Figure 12:
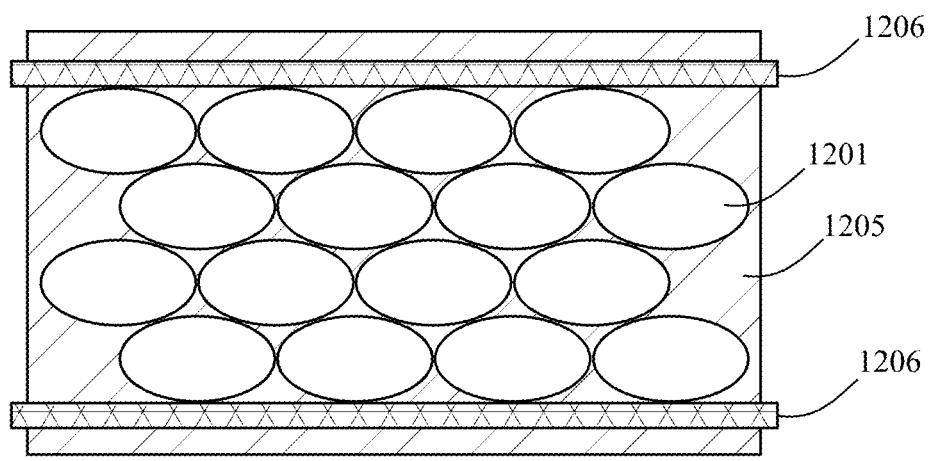
FIG. 12 shows ellipsoid shaped hollow shells in a metal matrix sandwiched between metal mesh cages.

FIG. 12 shows ellipsoid shaped hollow shells 1201 in a metal matrix 1205 sandwiched between metal mesh cages 1206. The ellipsoid shapes have a natural tendency to pack in an ordered array.

Right cylinders with a circular, hexagonal, or square face will provide additional beneficial properties to a metal matrix if they are properly ordered.

Figure 13A:
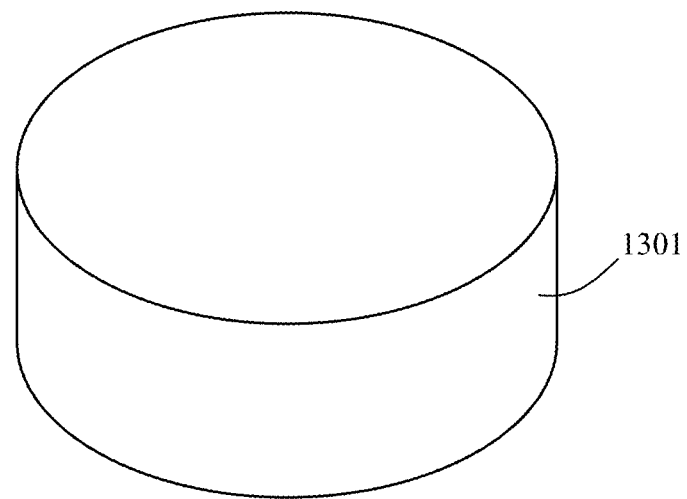
FIG. 13A is a perspective view of a hollow right circular cylinder.

FIG. 13A is a perspective view of a hollow right circular cylinder 1301.

Figure 13B:
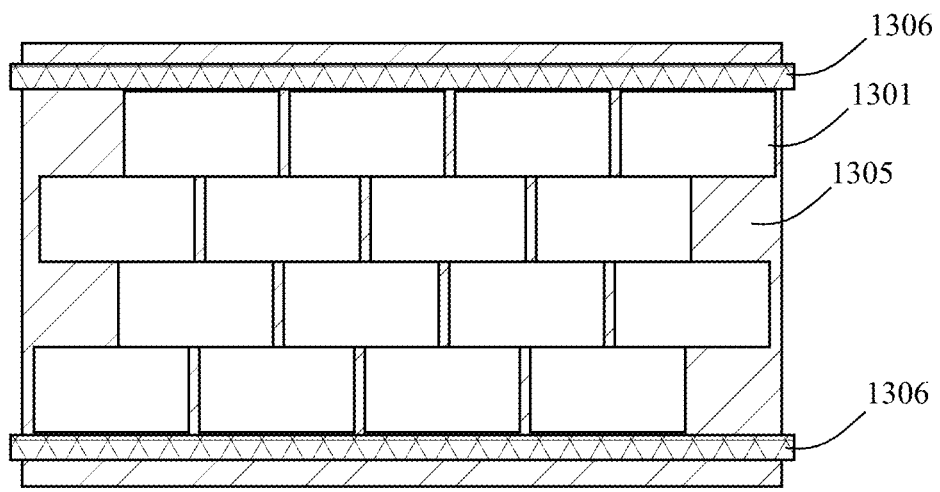
FIG. 13B shows a matrix of hollow right circular cylinders stacked between a mesh cage with metal matrix material surrounding.

FIG. 13B shows a matrix of hollow right circular cylinders 1301 stacked between a mesh cage 1306 with metal matrix material 1305 surrounding. In this case, the circular faces of the right circular calendar are all ordered in the same direction.

Figure 14A:
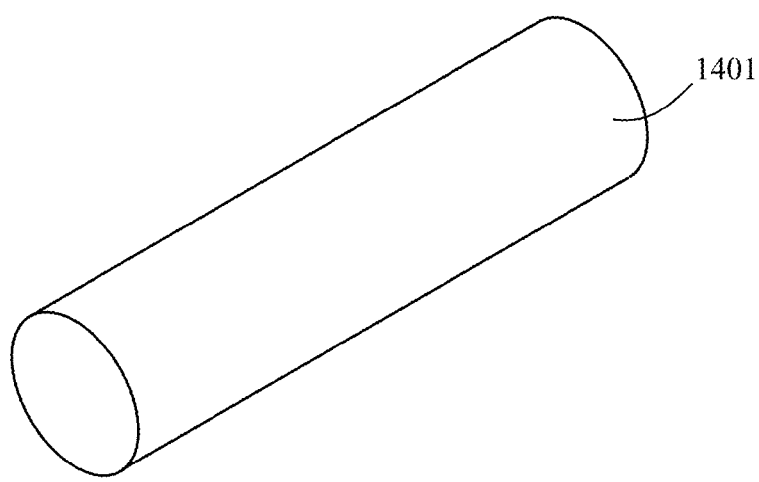
FIG. 14A is a perspective view of a hollow right circular cylinder with a different aspect ratio.

FIG. 14A is a perspective view of a hollow right circular cylinder 1401 with a different aspect ratio.

Figure 14B:
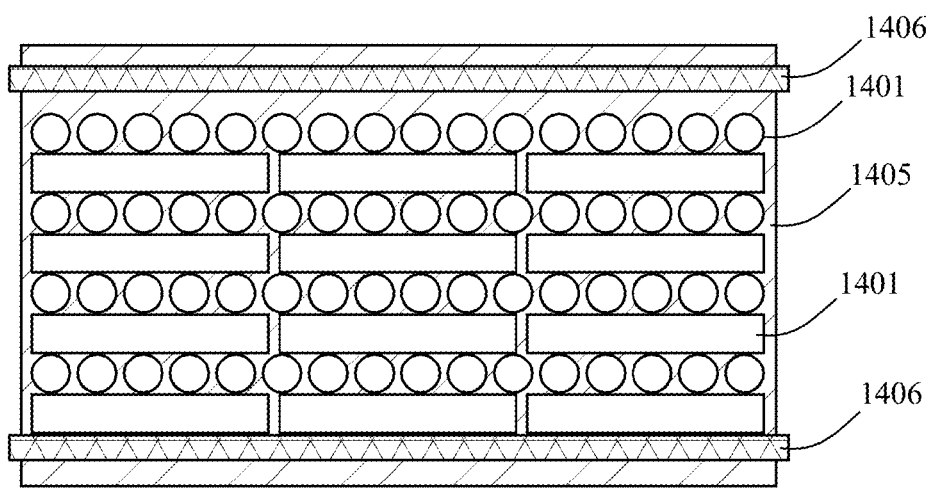
FIG. 14B shows an alternative alignment in which the hollow right circular cylinders have a different aspect ratio and are aligned differently with respect to the metal cage

FIG. 14B shows an alternative alignment in which the hollow right circular cylinders 1401 have a different aspect ratio and are aligned differently with respect to the metal cage 1406. FIG. 14B also illustrates that different layers can have different orientation.

Figure 15:
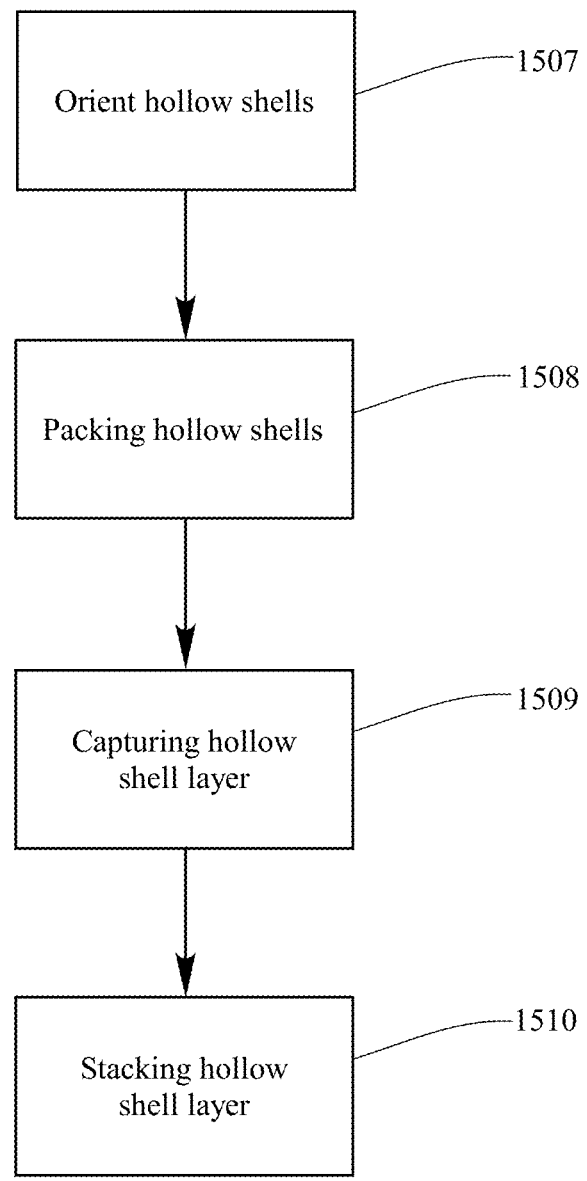
FIG. 15 illustrates a process for ordering hollow shells into uniform alignment.

Hollow shells can be ordered in one or more layers. A single ordered layer can be achieved through various vibratory and mechanical means. After the desired order is achieved, the shells can be captured by tape to prevent further motion. FIG. 15 illustrates a process for ordering hollow shells into uniform alignment. The process consists of orienting hollow shells 1507, packing the hollow shells together 1508, capturing the hollow shell layers 1509, and stacking the hollow shell layers 1510.

Figure 15A:
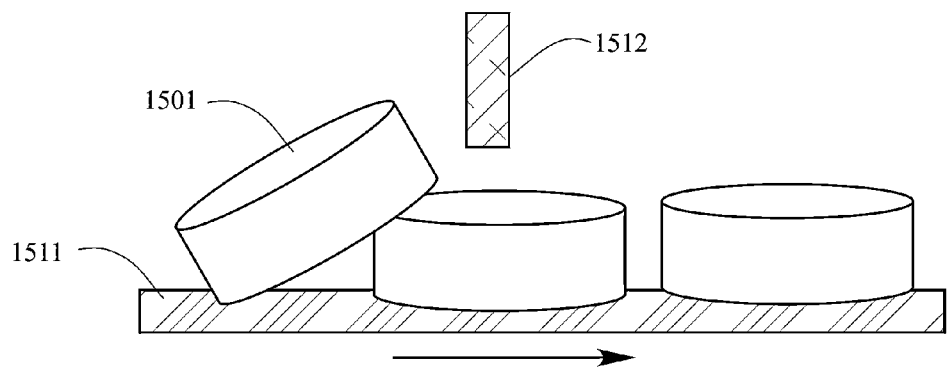
FIG. 15A illustrates a simple method of orienting hollow shells.

FIG. 15A illustrates a simple method of orienting hollow shells 1501. Hollow shells 1501 are randomly poured onto a conveyor belt 1511 and passed under a bar 1512 of specified height. Shells 1501 will only pass under the bar if they are in correct orientation. Optional brushing means (not shown) can be used to prevent clogs.

Figure 15B:
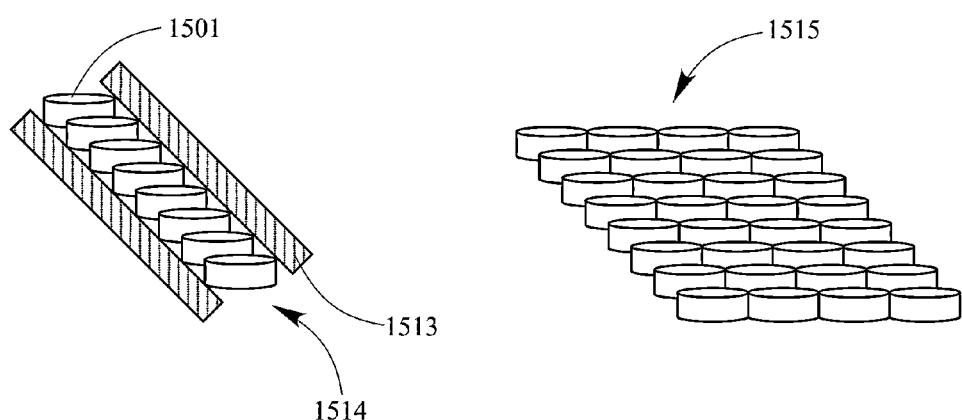
FIG. 15B shows shells being mechanically positioned for a close packing.

FIG. 15B shows shells 1501 being mechanically positioned for a close packing. Hollow shells 1501 are organized into rows 1514 through mechanical means 1513. Rows 1514 are grouped into arrays 1515.

Figure 15C:
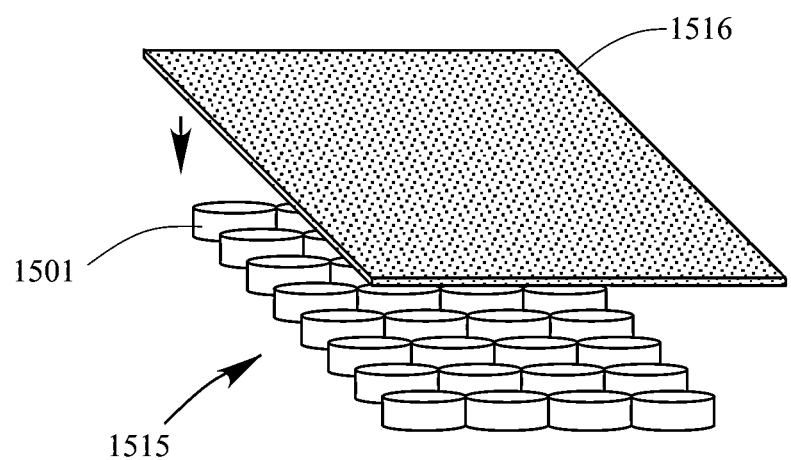
FIG. 15C shows one means of capturing arrays of hollow shells.

FIG. 15C shows a means of capturing arrays 1515 of hollow shells 1501 with sticky tape 1516.

Figure 15D:
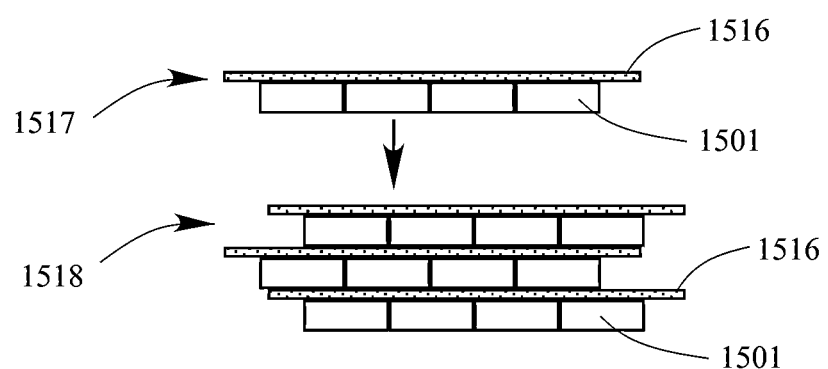
FIG. 15D single arrays of hollow shells are stacked to form three dimensional arrays.

In FIG. 15D single arrays 1517 of hollow shells 1501 are stacked to form three dimensional arrays 1518. The arrays 1518 can be place in optional mesh cages (not shown). The tape 1516 between layers can be pyrolized prior to introducing the molten metal matrix.

Optional Heat Treatments

Heat treating the alloys increases strength and hardness of the precipitation-hardenable wrought and cast alloys. These usually are referred to as the "heat-treatable" alloys to distinguish them from those alloys in which no significant strengthening can be achieved by heating and cooling. Heat treatment to increase strength of an alloy is a three-step process:
Solution heat treatment: dissolution of soluble phases
Quenching: development of supersaturation
Age hardening: precipitation of solute atoms either at room temperature (natural aging) or elevated temperature (artificial aging or precipitation heat treatment).

In the case of a metal matrix comprised of hollow shells of one alloy encapsulated by hollow shells of another alloy it is beneficial to apply two or more heat treatment cycles to the matrix to optimally strengthen each of the components.

Figure 16:
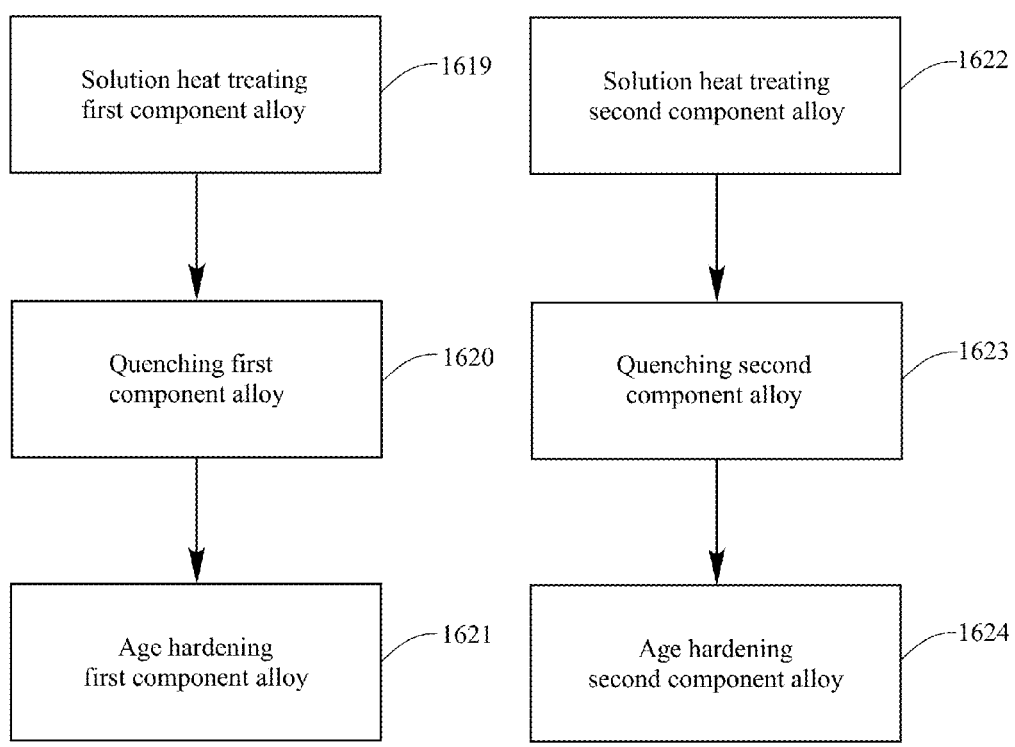
FIG. 16 is a block diagram illustrating the process of heat-treating two metals in a foam matrix.

FIG. 16 shows the steps of heat-treating two metals in a foam matrix. Each metal will undergo the process of heat-treating, quenching, and age hardening. The two heat treating processes can take place sequentially or overlap depending on the heat cycles of the alloys.

Shell Materials

The hollow shell may be constructed of any suitable material such as glass, ceramic, glass ceramic, plastic, and metal. Inorganic compounds of metals and/or metalloids, including alloys, mixtures, or combinations thereof are contemplated, such as oxides, carbides, nitrides, nitrates, silicates, silicides, aluminates, phosphates, sulfates, sulfides, borates, and borides.

The metals and/or metalloids are selected from magnesium, calcium, strontium, barium, yttrium, lanthanum, cerium, neodymium, gadolinium, terbium, erbium, thorium, titanium, zirconium, hafnium, vanadium, niobium, tantalum, chromium, molybdenum, tungsten, manganese, rhenium, iron, ruthenium, osmium, cobalt, rhodium, iridium, nickel, copper, silver, zinc, cadmium, boron, aluminum, gallium, indium, thallium, carbon, silicon, germanium, tin, lead, phosphorus, and bismuth.

Inorganic shell materials suitable for use are magnesium oxide(s), aluminum oxide(s), zirconium oxide(s), and silicon carbide(s) such as $MgO$, $Al_2O_3$, $ZrO_2$, $SiO_2$, and/or $SiC$.

The shell may also be composed of or contain carbides, borides, nitrides, silicides, sulfides, oxides and other compounds of metals and/or metalloids of Groups IV and V as disclosed and prepared in U.S. Pat. No. 3,979,500 (Sheppard et al.), incorporated herein by reference. Group IV compounds including borides of Group IVB metals such as titanium, zirconium, and hafnium and Group VB metals such as vanadium, niobium, and tantalum are contemplated.

In one embodiment, the shell is made of fused particles of glass, ceramic, glass ceramic, refractory, fused silica, quartz, or like amorphous and/or crystalline materials including mixtures of such.

In another embodiment, the shell is made of an aluminate silicate or contains a layer of aluminate silicate. It is also contemplated that the plasma-shell may be made of lead silicates, lead phosphates, lead oxides, borosilicates, alkali silicates, aluminum oxides, and pure vitreous silica.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A metal syntactic foam comprising a multiplicity of hollow shells within a metal foam matrix, the hollow shells having been coated with a material prior to being introduced to the matrix, said material being selected to reduce the formulation of intermetallics between the hollow shells and the metal matrix, said material having whiskers or fibers.

2. The metal syntactic foam of claim 1 in which the shells are coated with a material selected from nickel, copper, zinc, titanium and alloys thereof.

* * * * *